(12) United States Patent
Nix et al.

(10) Patent No.: US 7,001,561 B2
(45) Date of Patent: Feb. 21, 2006

(54) RIGHT ANGLE TUBE CONNECTOR

(75) Inventors: Richard A. Nix, Ortonville, MI (US); Keith V. Leigh-Monstevens, Rochester Hills, MI (US); Michael James Woodard, Utica, MI (US)

(73) Assignee: Automotive Products (USA), Inc., Auburn Hills, MI (US)

( * ) Notice: Subject to any disclaimer, the term of this patent is extended or adjusted under 35 U.S.C. 154(b) by 372 days.

(21) Appl. No.: 10/301,236

(22) Filed: Nov. 21, 2002

(65) Prior Publication Data

US 2004/0101587 A1   May 27, 2004

(51) Int. Cl.
*B29C 45/14* (2006.01)
*B29C 45/36* (2006.01)
*B29C 33/42* (2006.01)

(52) U.S. Cl. ............... 264/254; 264/259; 264/275; 425/577

(58) Field of Classification Search ............... 264/254, 264/259, 271.1, 275, 279, 279.1; 425/121, 425/577, 468
See application file for complete search history.

(56) References Cited

U.S. PATENT DOCUMENTS

| | | | | |
|---|---|---|---|---|
| 4,948,541 A | * | 8/1990 | Beck | 264/46.7 |
| 5,266,262 A | * | 11/1993 | Narayama et al. | 264/513 |
| 5,641,184 A | * | 6/1997 | Mortensen | 285/93 |
| 5,749,995 A | * | 5/1998 | Godeau | 156/242 |
| 5,773,036 A | | 6/1998 | Zimmer et al. | 425/125 |
| 6,273,404 B1 | | 8/2001 | Holman et al. | 264/276 |
| 6,287,501 B1 | * | 9/2001 | Rowley | 264/254 |
| 6,432,345 B1 | * | 8/2002 | Warburton-Pitt | 264/263 |

FOREIGN PATENT DOCUMENTS

| | | |
|---|---|---|
| DE | 19543318 | 5/1997 |
| DE | 19600010 | 7/1997 |
| DE | 19754569 | 6/1999 |
| WO | WO 98/00663 | 1/1998 |
| WO | WO 03/029715 | 4/2003 |

OTHER PUBLICATIONS

Photocopy from Brochure of Degussa Corporation showing glass reinforced Nylon 12 connector molded over the end of an Nylon 12 extruded tube.

* cited by examiner

*Primary Examiner*—Angela Ortiz
(74) *Attorney, Agent, or Firm*—Young & Basile, P.C.

(57) ABSTRACT

A method and apparatus for molding a right angle connector onto a tube end portion. The tube end portion is positioned in a mold cavity; an axially extending core is positioned in the mold cavity with the axis of the core at a right angle to the axis of the tube end portion and with an inboard end of the core positioned proximate the open end of the tube end portion; a molten plastic material is injected into the mold cavity in surrounding relation to the core and the tube end portion; and the core is removed to form a connector fixedly secured to the tube end portion and having a central axial bore communicating with the open end of the tube, extending at a right angle to the central axis of the tube end portion, and conforming to the configuration of the core.

7 Claims, 5 Drawing Sheets

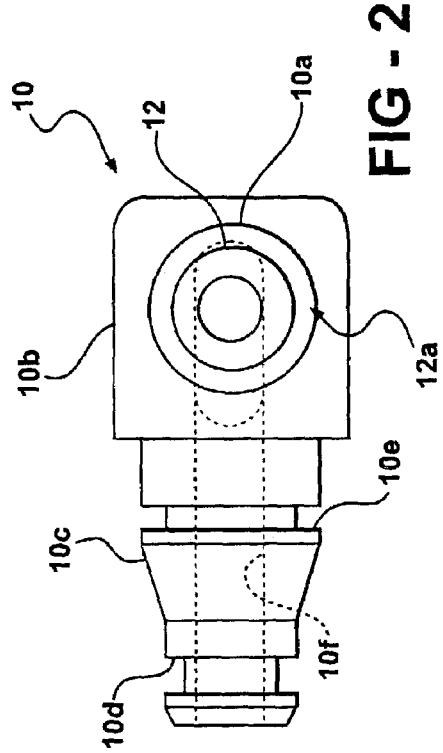
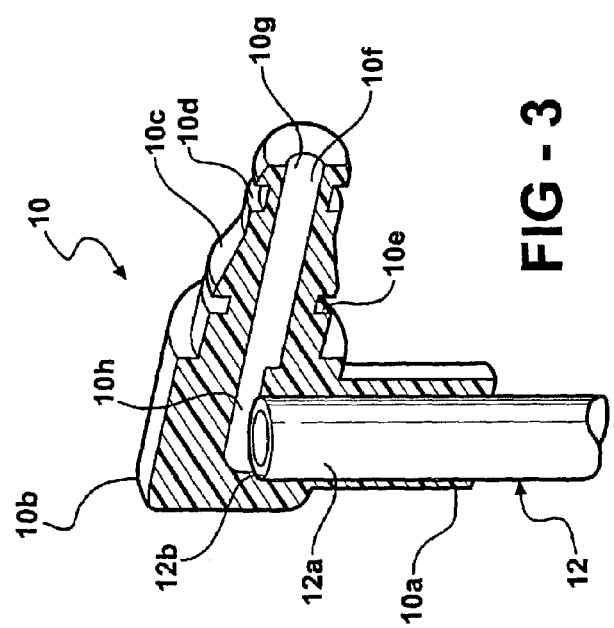
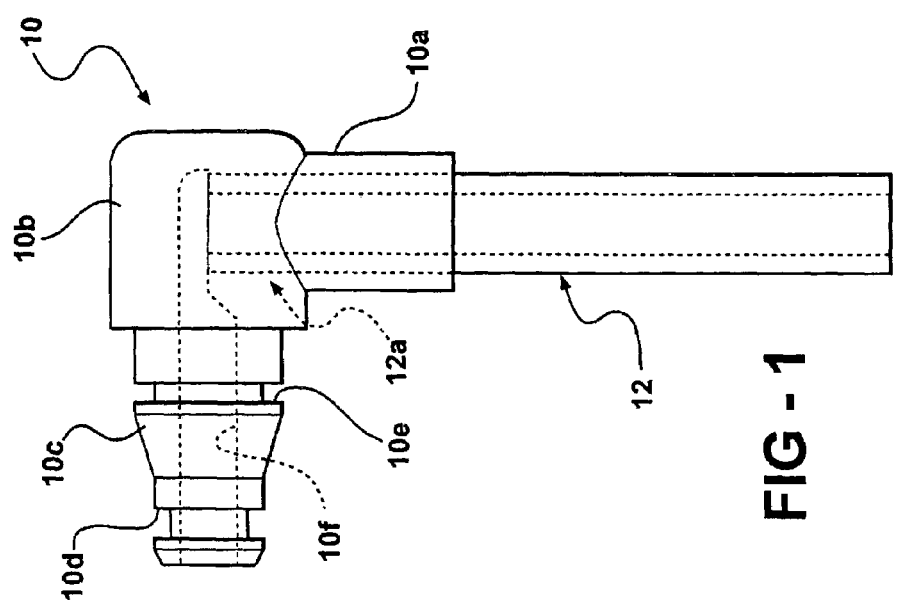

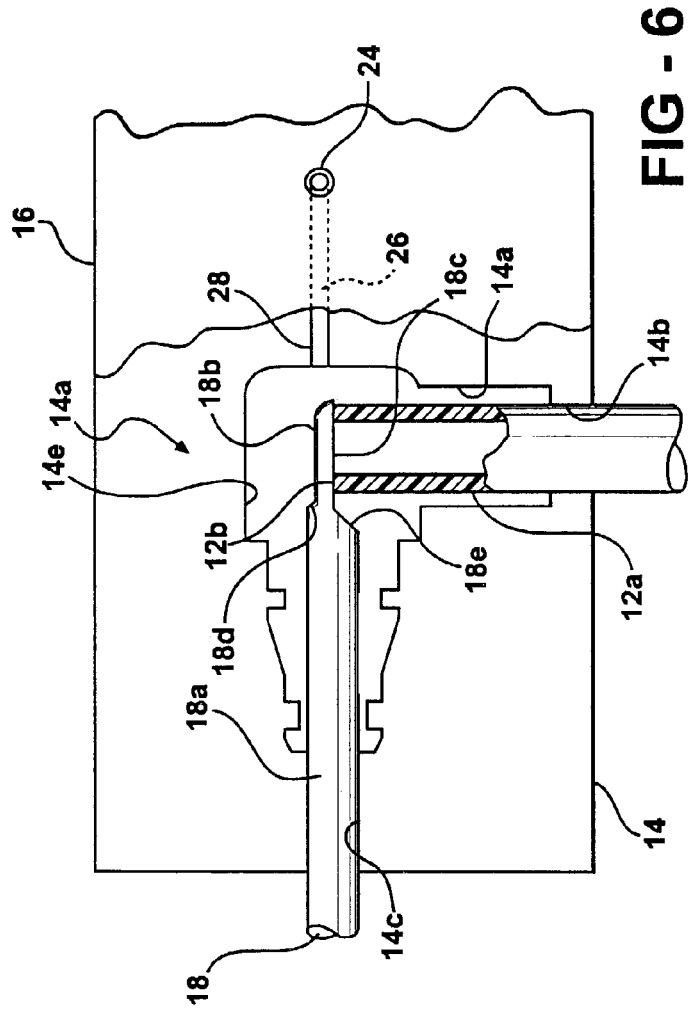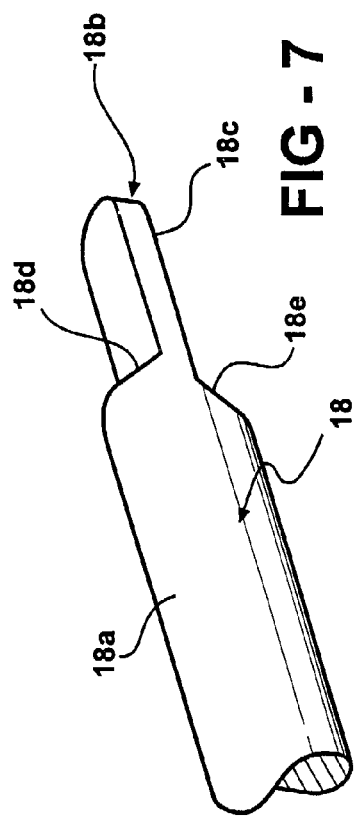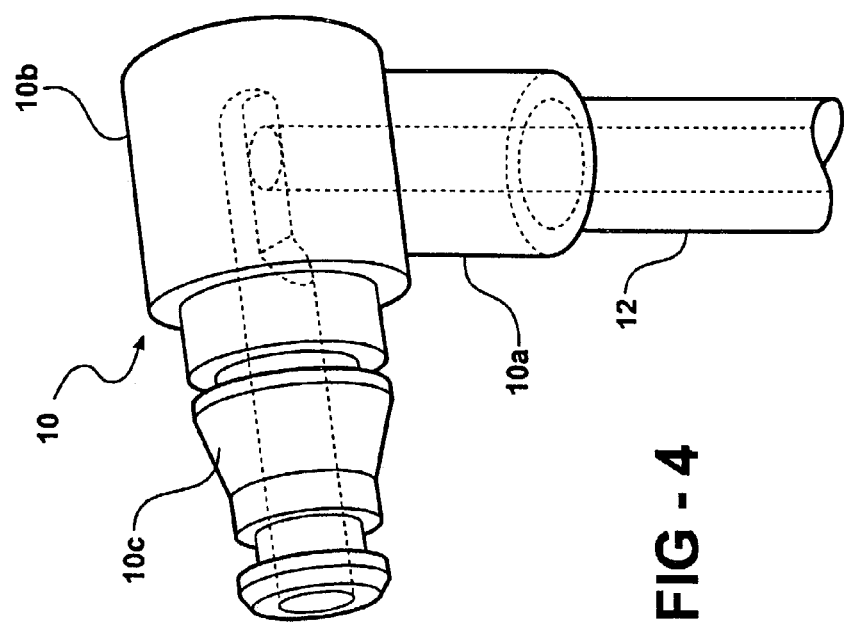

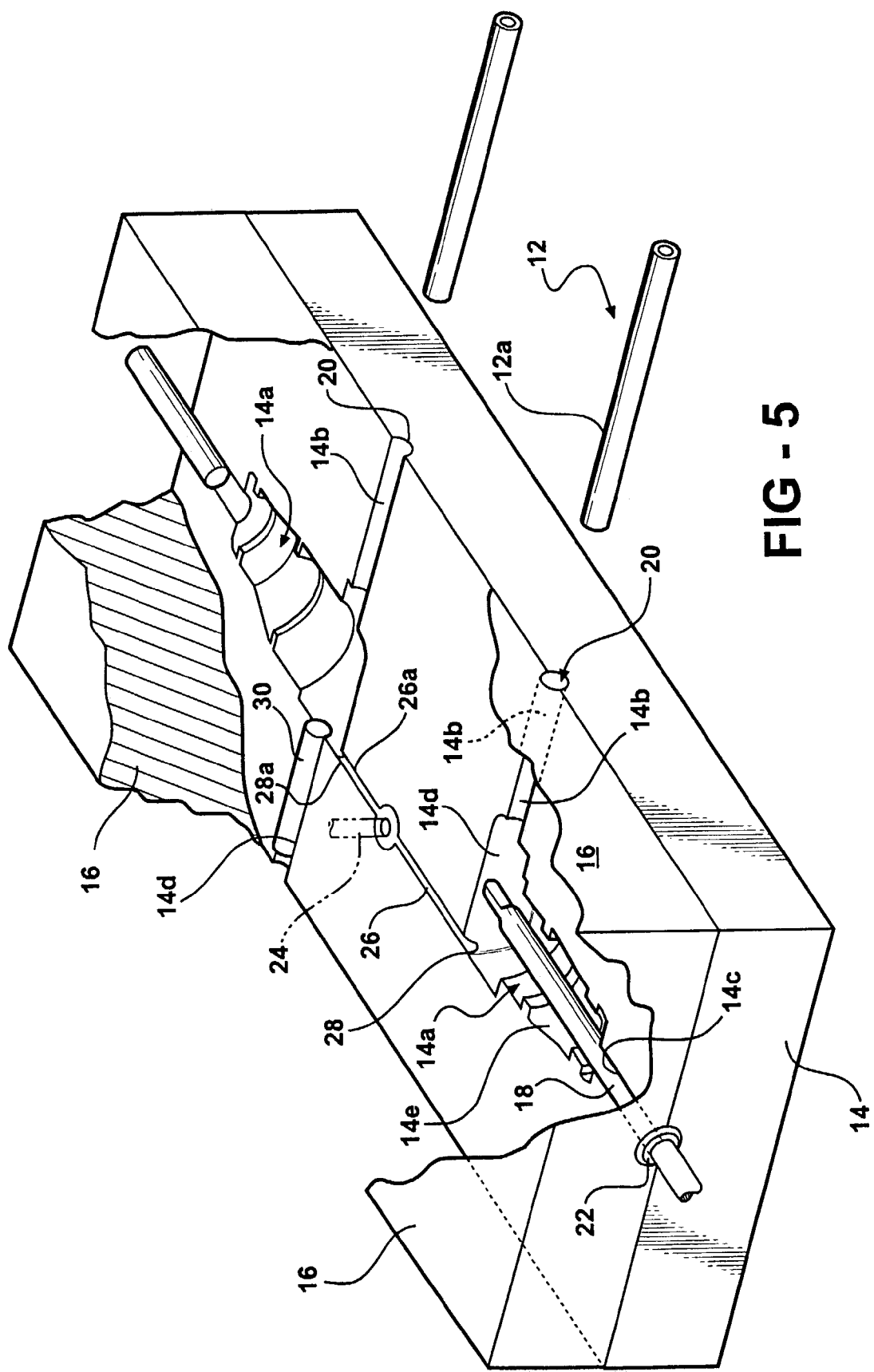

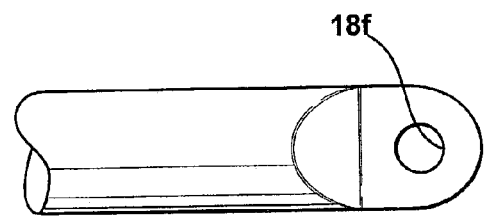
FIG - 11
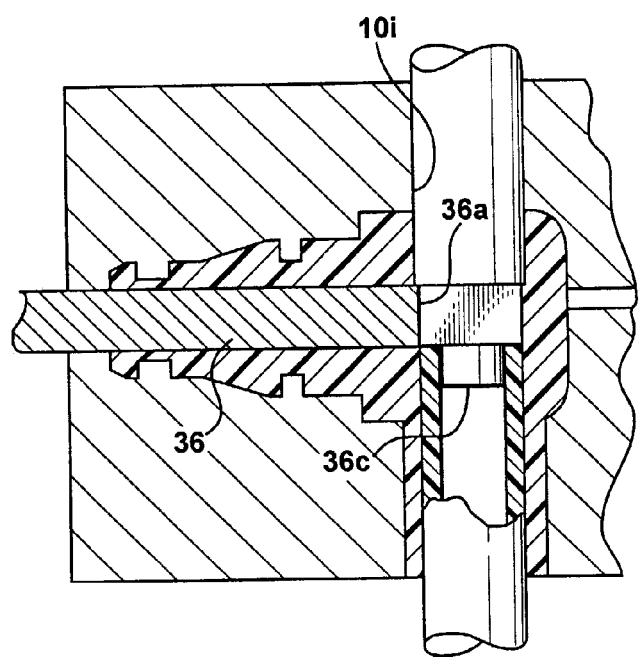
FIG - 12
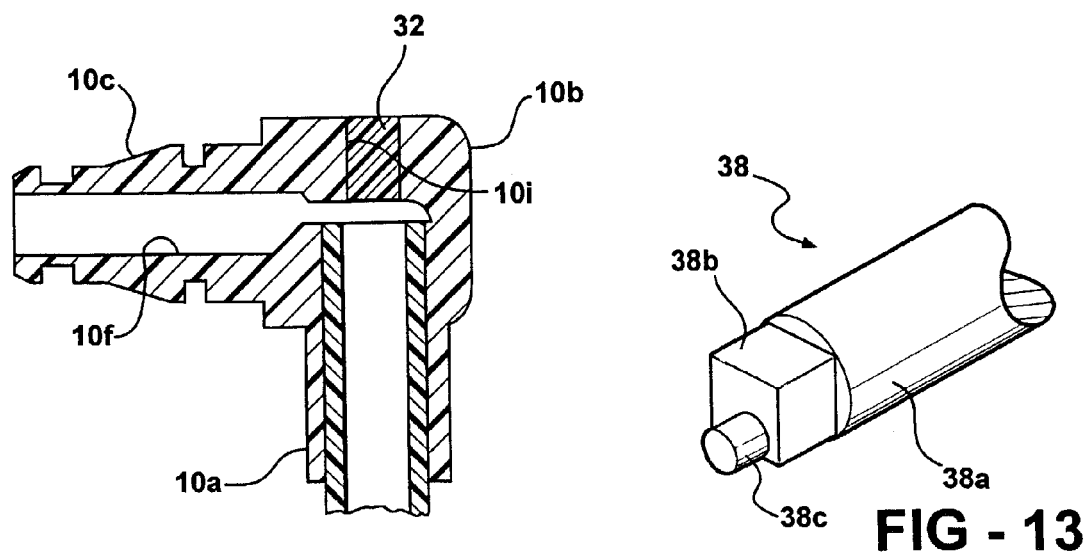
FIG - 14
FIG - 13

RIGHT ANGLE TUBE CONNECTOR

BACKGROUND OF THE INVENTION

This invention relates to connectors and more particularly to a method ands apparatus for forming a right angle connector on the end of a tube.

Right angle tube connectors are required in a myriad of plumbing scenarios. In a typical prior art right angle connector, a first tubular connector member is fitted onto an open end of a tube, either over the tube or into the tube, and a second tubular connector member is secured at right angles to the first connector member. This procedure is both time consuming and expensive.

SUMMARY OF THE INVENTION

This invention is directed to the provision of an improved right angle tube connector.

More specifically this invention is directed to a right angle tube connector formed in a simple molding operation.

According to the invention, a tube end portion is positioned in a mold cavity; an axially extending core is positioned in the mold cavity with the axis of the core at a right angle to the axis of the tube end portion and with an inboard end of the core positioned proximate the open end of the tube end portion; a molten plastic material is injected into the mold cavity in surrounding relation to the core; and the core is removed to form a connector fixedly secured to the tube end portion and having a central axial bore communicating with the open end of the tube, extending at a right angle to the central axis of the tube end portion, and having a configuration conforming to the configuration of the core. This methodology provides a simple and inexpensive means of providing a right angle tube connector.

In a first embodiment of the invention the inboard end of the core is positioned over and seals off the open end of the tube whereby to preclude the entry of molten plastic material into the open end of the tube.

In a second embodiment of the invention a laterally extending side core is further provided which bears against the inboard end of the axial core to maintain the inboard end in firm sealing engagement with the open end of the tube.

In a third embodiment of the invention the side core passes through an aperture in the inboard end of the axial core for positioning in the open end of the tube so that the inboard end of the side core and the inboard end of the axial core coact to preclude the entry of molten plastic material into the open end of the tube.

In a fourth embodiment of the invention the inboard end of the side core abuts against the inboard end of the axial core and includes a further portion extending into the open end of the tube.

In each of the embodiments involving a side core, the side core is removed following the injection of the molten plastic material and a plug of plastic material is inserted into the aperture in the connector left by the removal of the side core.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein:

FIG. 1 is a plan view of a tube with a right angle connector formed thereon according to the invention;

FIG. 2 is a side view of the tube and connector;

FIG. 3 is a perspective cross-sectional view of the tube and connector;

FIG. 4 is a perspective view of the tube and connector;

FIG. 5 is a fragmentary exploded view of a mold assembly utilized in the formation of the right angle connector;

FIG. 6 is a fragmentary plan view of the mold assembly;

FIG. 7 is a fragmentary perspective view of an axial core utilized in the mold assembly;

FIG. 11 is a fragmentary elevational view of the axial core of FIG. 10;

FIG. 12 is a cross-sectional view of a still further modified mold assembly;

FIG. 13 is a fragmentary perspective view of a side core utilized in the mold of assembly of FIG. 12;

FIG. 14 is a cross-sectional view of a tube and connector formed utilizing the mold assembly of FIG. 8 or the mold assembly of FIG. 9.

DETAILED DESCRIPTION OF THE PREFERRED EMBODIMENT

Figure 8:
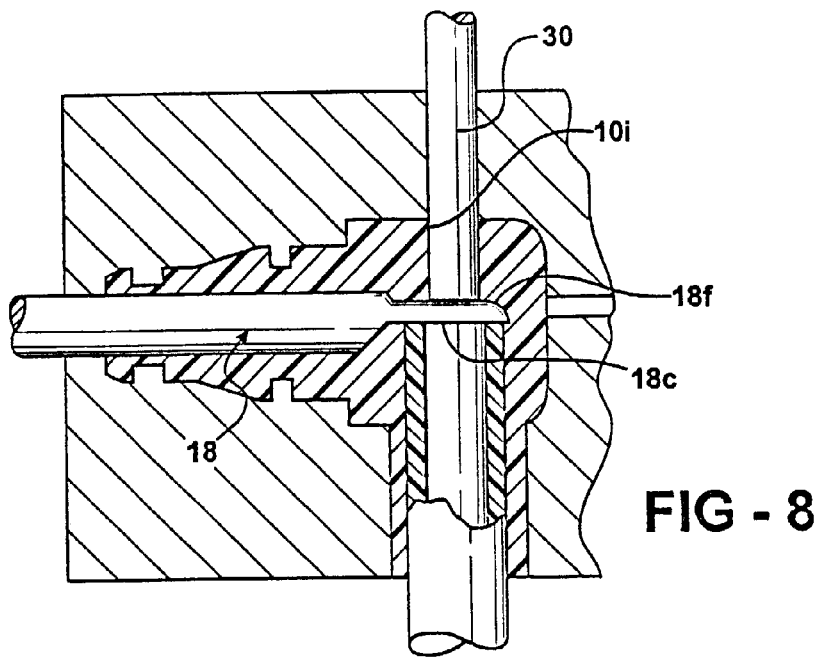
FIG. 8 is a cross-sectional view of a modified mold assembly.

As seen in FIG. 1, a connector 10 is formed according to invention in a molding operation on an open end portion 12a of a tube 12.

With additional reference to FIGS. 2, 3 and 4, the connector 10 includes a tubular portion 10a telescopically positioned over the tube end portion 12a, a main body portion 10b, and a fitting portion 10 extending at a right angle to tubular portion 10a. It will be understood that fitting portion 10c is arranged to fit telescopically within a port defined in an apparatus to which it is desired to deliver fluid through the tube 12 and, in known manner, includes a groove 10d for receipt of an O-Ring and a further groove 10e for receipt of a suitable clip whereby to fixedly secure the fitting portion 10c to the apparatus defining the port.

A central, axially extending bore 10f is defined in fitting portion 10c and in main body portion 10b. Bore 10f includes a main body portion 10g and a reduced diameter, relatively flat portion 10h positioned in overlying relation to the open end of the tube end portion 12a. The central axis of bore 10f will be seen to be disposed at a right angle to the central axis of the tube 12 so that the connector 10 forms a right angle connector with respect to the tube 12.

The manner in which the connector 10 is molded onto the tube end portion 12 is best understood with reference to FIGS. 5 and 6.

The molding apparatus utilized to mold the connector 10 onto the end portion of the tube 12, broadly considered, includes a lower die or mold half 14, an upper die or mold half 16, and an axial core member 18. Lower die 14 defines the lower half 14a of a mold cavity, a semi circular lower groove half 14b sized to receive tube 12, and a semi circular lower groove half 14c sized to receive axial core 18. It will be understood that upper die 16 includes a complimentary upper half of the mold cavity and complimentary upper groove halves coacting with the mold cavity 14a and the semicircular grooves 14b and 14c to form the total mold cavity, a cylindrical bore 20 for slidable receipt of a tube end portion 12a, and a cylindrical bore 22 for slidable receipt of axial core member 18.

The mold apparatus, in known manner, further includes a sprue 24, a runner 26 extending from the lower end of the sprue to the mold cavity, and a gate 28 at the entry of the runner 26 into the mold cavity.

Axial core member 18 (see also FIG. 7) includes a cylindrical main body portion 18a slidably received in bore 22 and a flat inboard end portion 18b defining a flat sealing surface 18c and connected to the main body portion 18a by chamfered surfaces 18d and 18e.

In the use of the mold apparatus to form the connector 10 on the tube end portion 12a, a tube 12 is positioned in the groove 14b of the lower die to position the tube end portion 12a in the mold cavity; axial core member 18 is positioned in the groove 14c with tip portion 18b overlying the open end of the tube and sealing surface 18c sealingly engaging the annular end portion 12b of the tube; the upper die is positioned over the lower die; molten plastic material (such for example as glass reinforced Nylon 12) is supplied to sprue 24 for passage through runner 26 and through gate 28 into the mold cavity to fill the mold cavity in surrounding relation to the tube end portion 12a and the axial core member; and following setting of the plastic material, the upper die is removed from the lower die and the axial core 18 is removed. This molding procedure forms a connector 10 fixedly secured to the tube end portion 12a and having an axial bore 10f communicating with the open end of the tube, extending at a right angle to the central axis of the tube end portion, and conforming to the configuration of the axial core core member.

With continued reference to FIGS. 5 and 6, it will be seen that the mold cavity 14a includes a first annular portion 14d in surrounding relation to the received tube end portion and defining the tubular portion 10a of the connector and a second annular portion 14e extending at a right angle to the first portion in surrounding relation to the received core and defining the main body portion 10b and the fitting portion 10c of the connector. It will further be seen that the bore 20 slidably receiving the tube end portion opens at its inboard end in cavity portion 14d and the bore 22 slidably receiving the axial core member opens at its inboard end in cavity portion 14e.

In the modified form of mold apparatus seen in FIG. 8 the core structure further includes a side or lateral core member 30 positioned in a groove 14d in the lower die for sliding movement in a bore defined between the upper and lower dies coaxial with the bore 20.

It will be seen that the mold apparatus shown in FIG. 5 is intended to simultaneously form two connector members (utilizing a further runner 26a and a further gate 28a) and that, for purposes of illustration, the left or lower portion of the mold apparatus in FIG. 5 has been illustrated to show the methodology of FIG. 6 and the right or upper half of the mold apparatus in FIG. 5 has been configured to show the methodology of FIG. 8 utilizing the auxiliary or side core member 30.

The methodology utilizing the mold apparatus in FIG. 8 is identical to the methodology utilizing the mold apparatus of FIG. 6 with the exception that the side core member 30 is positioned against the face 18f of the inboard end 18b of the axial core member during the injection molding operation to insure that the surface 18c of the inboard end of the axial core member remains in firm sealing engagement with the annular end 12b of the tube end portion to preclude the entry of molten plastic material into the interior of the tube. Following the setting of the plastic material and removal of the upper die, axial core member, and the side core member, the aperture 10i formed in the connector 10 by virtue of the side core 30 is filled with a plug 32 (FIG. 14) formed of a material identical to or similar to the material used in the injection molding process.

Figure 9:
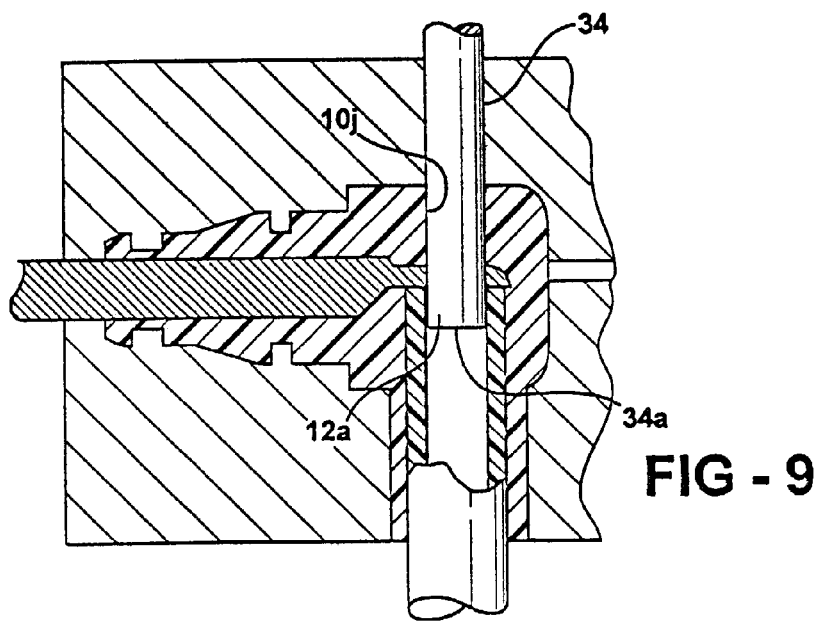
FIG. 9 is a cross-sectional view of a further modified mold assembly.
Figure 10:
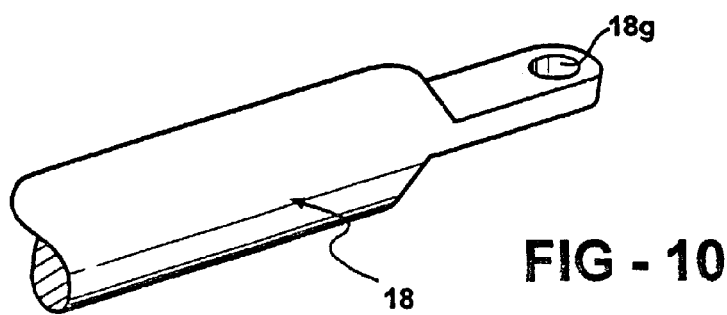
FIG. 10 is a fragmentary perspective view of an axial core utilized in the mold assembly of FIG. 9.

In the modified form of mold apparatus seen in FIGS. 9 and 10, the inboard end 18b of the axial core member includes a central core aperture 18g and the side core member 34 is sized to pass through the aperture 18g for entry into the open end of tube end portion 12a whereby the inboard end 34a of the side core member coacts with the end portion of the axial core member to preclude the entry of molten plastic material into the open end of the tube. As with the FIG. 8 embodiment, following removal of the upper die and the axial and side core members, a plug 32 is positioned in the bore 10i in the connector formed by the side core member 34.

In the modified form of mold apparatus seen in FIG. 12 and 13, the axial core member 36 comprises a cylindrical bar having a flat circular end 36a and the side core member 38 includes a cylindrical portion 38a for sliding receipt in the cylindrical bore defined by the upper and lower dies, a portion of square cross-section defining flats 38b, and a cylindrical inboard plug portion 38c. In use, a flat 38b on the square cross-section portion of the side core member coacts with the flat end 36a of the cylindrical core 36 and the plug portion 36c is received in the open end of the tube end portion to preclude the entry of molten plastic into the tube end portion. As with the FIGS. 8 and 10 embodiments, a plug 32 is positioned in the bore 10i defined in the connector by the side core.

It will be seen that, in the finished product, and irrespective of the mold methodology employed, the connector includes a tubular portion 10a fixedly secured over the end portion 12a of the tube, a main body portion 10b of generally circular configuration conforming to the corresponding portion of the mold cavity, and a fitting portion 10c conforming to the corresponding portion of the mold cavity and having a central bore communicating with the open end of the tube, extending at right angles to the central axis of the tube end portion, and conforming to the configuration of the core or cores.

The invention apparatus and methodology will be seen to provide a quick, inexpensive and effective means of providing a right angle fitting on a tube.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A method of forming a right angle connector at an end portion of a tube comprising the steps of:
   positioning the tube end portion in a mold cavity;
   positioning an axially extending core structure in the mold cavity with the axis of the core structure at a right angle to the axis of the tube end portion and with an inboard end of the core structure positioned in overlying relation to and sealing off the open end of the tube end portion;
   injecting a molten plastic material into the mold cavity in surrounding relation to the core structure and the tube end portion; and
   removing the core structure to form a connector fixedly secured to the tube end portion and having a central axial bore communicating with the open end of the tube, extending at a right angle to the central axis of the tube end portion, and conforming to the configuration of the core structure.

2. A method according to claim 1 wherein the mold cavity includes a first portion, sized to receive the tube end portion and defining an annular space around the received tube end portion, and a second portion extending at a right angle to the first portion, sized to receive the core structure, and defining an annular space around the received core structure.

3. A method according to claim 2 wherein:
the mold cavity is defined by a mold apparatus;
the mold apparatus further defines a first bore opening at an inboard end thereof in the first cavity portion and sized to slidably receive a tube end portion and a second bore extending at right angles to the first bore, opening at an inboard end thereof in the second cavity portion, and sized to slidably receive the core structure.

4. A method according to claim 1 wherein:
the core structure includes an axially extending core member and a laterally extending side core member.

5. A method according to claim 4 wherein the side core member bears against the inboard end of the axial core member to maintain the inboard end in firm sealing engagement with the open end of the tube end portion.

6. A method according to claim 4 wherein the side core member passes through an aperture in the inboard end of the axial core member for positioning in the open end of the tube end portion.

7. A method according to claim 4 wherein the side core member includes a portion abutting against the inboard end of the axial core member and a further plug portion extending into the open end of the tube end portion.

* * * * *